United States Patent [19]
Ribich et al.

[11] 3,914,144
[45] Oct. 21, 1975

[54] METHOD OF MAKING A FASTENING DEVICE BY SPIN WELDING

[75] Inventors: William A. Ribich, Lexington; David B. Russell, Ashland, both of Mass.

[73] Assignee: American Velcro, Inc., New York, N.Y.

[22] Filed: May 9, 1974

[21] Appl. No.: 468,505

Related U.S. Application Data

[62] Division of Ser. No. 112,353, Feb. 3, 1971, Pat. No. 3,851,357.

[52] U.S. Cl. ............... 156/73.5; 24/204; 24/208 A; 29/470.3; 156/293; 156/303.1; 156/306; 228/2; 264/68; 24/DIG. 18
[51] Int. Cl.² ......................................... B32B 31/16
[58] Field of Search ......... 24/204, 205.11 F, 208 A, 24/213 R, 214, DIG. 18; 228/2; 29/470.3; 156/73, 293, 423, 303.1, 306; 264/68, 69

[56] References Cited
UNITED STATES PATENTS

| | | |
|---|---|---|
| 3,580,793 | 5/1971 | Hewitt .................................. 156/73 |
| 3,650,647 | 3/1972 | Jacobs et al. ......................... 425/109 |
| 3,695,976 | 10/1972 | Erb ......................................... 24/204 |
| 3,815,182 | 6/1974 | Guard et al. ....................... 24/208 A |

*Primary Examiner*—Edward G. Whitby
*Attorney, Agent, or Firm*—Pennie & Edmonds

[57] ABSTRACT

A fastening structure and method of making same is disclosed which comprises a fastening member having a base element and a plurality of hooking elements projecting from one surface of the base element and a snap fastening member having a base member and a holding means protruding centrally from one side of the base member for attaching the snap fastening member to a mounting plate, said fastening member and snap fastening member being secured together in melt-bonded relationship.

4 Claims, 12 Drawing Figures

U.S. Patent Oct. 21, 1975 3,914,144
FIG. 1
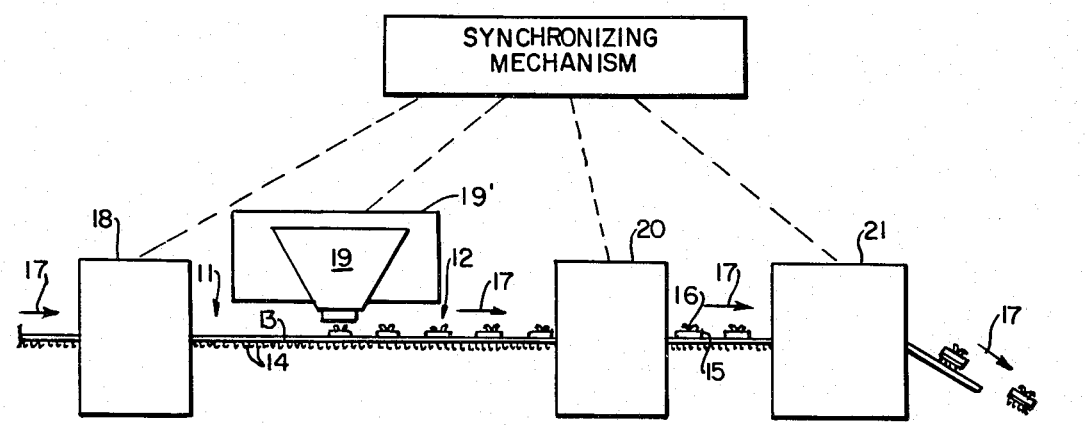
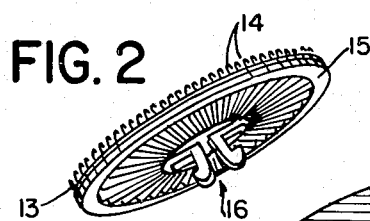
FIG. 2
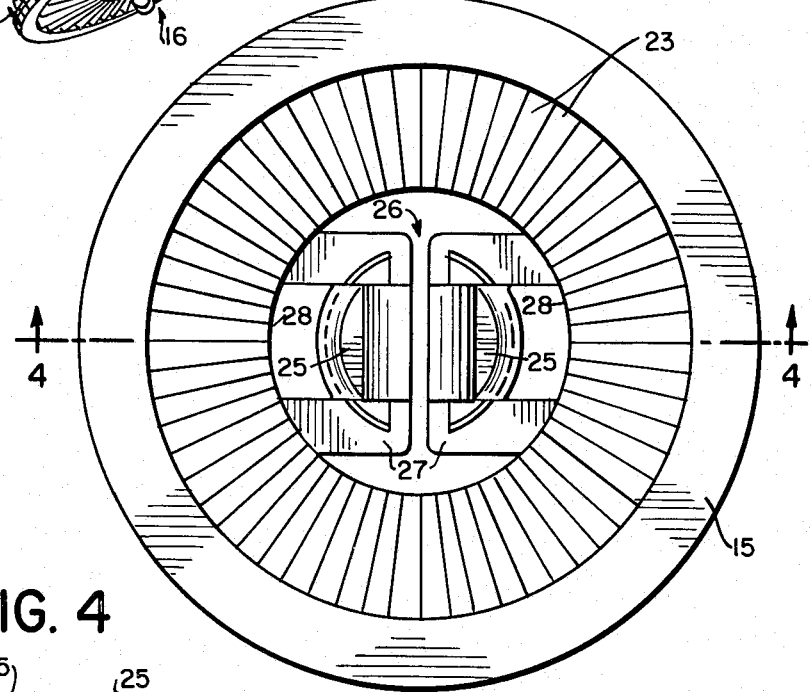
FIG. 3
FIG. 4
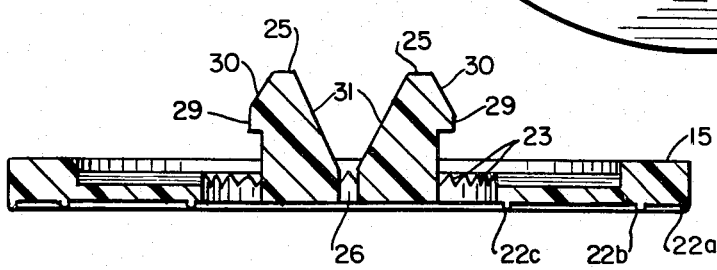

METHOD OF MAKING A FASTENING DEVICE BY SPIN WELDING

This is a division of application Ser, No. 112,353 filed Feb. 3, 1971, now U.S. Pat. No. 3,851,357, dated Dec. 3, 1974.

BACKGROUND OF THE INVENTION

Separable fasteners such as the hook and loop fasteners described in U.S. Pat. Nos. 2,717,437 and 3,009,235 are widely used for the purpose of attaching one object to another. In general, fasteners of this type include separable members each having a pile-like surface of hooking elements. Upon being pressed together in face-to-face relationship, the hooking elements of the separable members releasably interengage one another to hold the members together. In the above-mentioned U.S. patents, each separable member comprises a sheet of woven synthetic material having raised loop threads wherein the loops of one member are cut at their outer extremeties to form hook-type hooking elements while the loop threads of the other member remain uncut to form loop-type hooking elements. When these two members are pressed together in face-to-face relationship, there is substantial engagement of the hook-type hooking elements with the loop-type hooling elements. A considerable effort must be applied to separate the members unless they are peeled apart in which case the members are separated quite easily.

The number of applications in which separable fasteners of the type described above can be advantageously utilized is legion. However, a problem has long existed in industry because these flexible fastening devices are not readily adaptable in an assembly line operation, i.e., they cannot be attached to a surface with ease in a short period of time and they require special tools or procedures for assembly. For example, in numerous instances screws, nails or special adhesives are used to attach the fastening device to another surface. Furthermore, when any of these means are used to attach a fastening device, the device is not readily removable. Applicants have avoided these problems, and numerous other problems associated with known fastening devices, by providing a flexible fastening device which is easily and quickly attached to a surface, and as a result of this the device is efficiently adaptable to an assembly line operation.

It is therefore the principal object of this invention to overcome the disadvantages stated hereinabove by providing a fastening device which provides for fast attachment to a mounting plate without special tools, sufficient strength to hold with respect to the mounting plate when severe forces are applied to the device and which device is securely and tightly held with respect to the mounting plate, exhibiting substantially no freedom of movement when attached thereto. By providing a fastening device according to the present invention, we have overcome the shortcomings and inadequacies of prior art fastening devices.

U.S. Pat. No. 3,135,820 describes a fastening device for linesman's rubber blankets which comprises a button member having attached thereto hooking elements, the device being used for securing together opposing folds of the blanket. This device, unlike the device of the present invention, requires great freedom of movement of the button with respect to the blanket surface. Furthermore, the device is not designed to snap into an opening, but rather functions as a button which is inserted into a button hole. This type of attachment is clumsy and further emphasizes the great freedom of movement between the fastening member and the blanket. Related fastening devices are disclosed in U.S. Pat. No. 2,497,305, 2,538,396, 2,969,570, 3,031,730 and 3,179,969.

Various spin welding techniques for attaching two or more surfaces together are illustrated in U.S. Pat. Nos. 2,942,748, 3,244,574, 3,245,858, 3,338,775, 3,344,010, 3,385,741, 3,438,825, 3,444,018, 3,446,688, and 3,468,732.

SUMMARY OF THE INVENTION

In accordance with the teachings of the present invention, there is provided a fastening device which includes a fastening member having a base element and a plurality of flexible resilient hooking elements projecting from one surface of the base element which are adpated to be secured to a surface having complementary hooking elements by pressing opposed hooking elements and complementary hooking elements together in face-to-face relation. The device includes at least one snap fastening member having a base member and holding means protruding from one surface of the base member. The holding means are provided for snapping into locking engagement in an opening in a mounting plate and gripping the mounting plate in order to securely attach the snap fastening member to the mounting plate. The holding means are characterized by the property that applying forces to separate the hooking elements from the complementary hooking elements will increase the gripping action of the holding means in the opening and thus, further resist separation of the fastening member from the mounting plate, the base member being in contiguous relation with the mounting plate when the snap fastening member is attached to the mounting plate.

The holding means includes gripping members which are configured to deform inwardly when pressed into and through the opening in the mounting plate and then expand to their normal position when snapped through the opening in the plate. When in this normal position, the maximum dimension across the gripping members measured parallel to the base member is greater than the maximum lengthwise dimension measured across the opening in the mounting plate so that the fastening device cannot fall out of the opening in the mounting plate.

Either the fastening member or snap fastening member or both is made of meltable material and these members are joined together in integral melt-bonded relationship at an interface therebetween which is defined by contacting portions of the surface of the base element opposite to the surface thereof from which the hooking elements project and the surface of the base member opposite to the surface thereof from which the holding means protrudes.

The fastening member defines one member of a two member separable fastener the other member of which includes a plurality of complementary hooking elements which are releasably interengagable with hooking elements of the fastening device of this invention. When the fastening device of this invention is attached to a mounting plate by means of the protruding holding means of the snap fastening member, another object to which the fastening member having the complementary hooking elements is attached may be secured to the mounting plate simply by pressing the respective hooking elements together in face-to-face relationship.

The subject matter of this invention also includes a method for producing the fastening device described above. This method involves incrementally advancing the fastening member of the structure, in tape form, along a longitudinal path and placing a snap fastening member onto the fastening tape with the surface of the base member opposite to the surface thereof from which the holding means protrudes and the surface of the base element opposite to the surface thereof from which the hooking elements project in contacting relation. The snap fastening member is then spun at a high speed and under pressure against the fastening tape to create frictional heat and produce a film of molten material between the fastening member and snap fastening member at the places where they contact each other. Thereafter, the spinning of the snap fastening member is terminated thus allowing the molten material to cool and set, thus fusing the fastening member and snap fastening member in integral melt-bonded relationship.

As stated, either the fastening member or snap fastening member or both can be made of a meltable material. Preferably, the meltable material is a plastic material. However, the material is by no means limited to plastic and can include any meltable material, such as metal.

In addition, the fastening member and snap fastening member can be joined together by using a heat-sensitive adhesive located between the fastening member and snap fastening member where they are joined together. The spin welding technique mentioned above can be used to activate the heat-sensitive adhesive and thus join the two parts together. By using a heat-sensitive adhesive in this manner, either the fastening member or snap fastening member or both can be made of materials other than the plastic or metal materials mentioned above.

The term "contiguous" as used in the present specification includes within its meaning, two objects which are adjacent and close to one another but not touching, two objects which are in contact with one another but not along their entire boundaries, and also two objects which are in contact with one another along their entire boundaries. Thus, in the present invention it is intended that when the holding means is snapped into the opening in the mounting plate, the snap fastening member can be adjacent to but not in contact with the mounting plate, partially in contact with the mounting plate, or in complete contact with the mounting plate along the entire length of their adjoining boundaries. In referring to the holding means "securing the snap fastening member to the mounting plate" and "snapping into locking engagement" it is intended to mean that once the holding means are snapped into an opening in a mounting plate, the snap fastening member is tightly held to the mounting plate and exhibits substantially no movement when a force is applied thereto, i.e., there is substantially no movement of the snap fastening member along a plane lying along the axis of the holding means an substantially no movement of the snap fastening member along a plane lying perpendicular to the axis of the holding means.

BRIEF DESCRIPTION OF THE DRAWINGS

FIG. 1 is a schematic illustration of suitable apparatus which may be used to practice the method of the present invention.

FIG. 2 is a perspective view of a fastening device which may be produced according to this invention.

FIG. 3 is a top plan view of a snap fastening member of a fastening device of this invention.

FIG. 4 is a cross-sectional view of the snap fastening member taken along the lines 4—4 of FIG. 3.

DETAILED DESCRIPTION OF PREFERRED EMBODIMENTS

Figure 5:
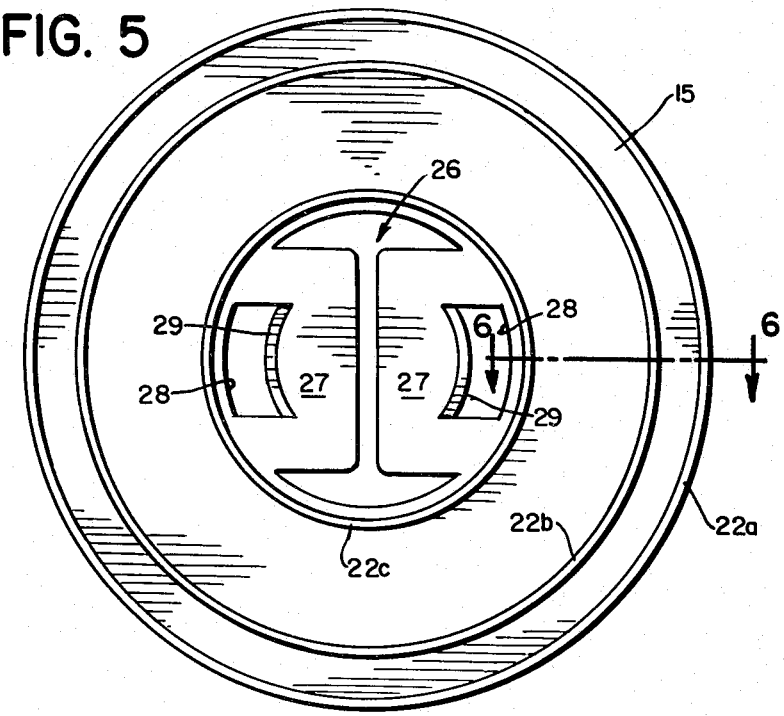
FIG. 5 is a bottom plan view of a snap fastening member of a fastening device of this invention.

With reference to FIG. 1, production of a fastening device of the present invention involves the use of a fastening member 11 in tape form and a snap-in snap fastening member 12 each of which is, according to the preferred embodiment, made of similar thermoplastic material, as for example, nylon. The fastening tape 11 comprises a base element 13 one surface of which includes a plurality of upstanding flexible resilient hooking elements 14. The hooking elements shown in the drawings comprise hook-type hooking elements, however, other hooking elements such as loop-type hooking elements may also be used. The function of the hooking elements will be described more fully below.

The snap fastening member comprises, for example, a base member 15 and holding means, indicated generally by reference numeral 16, protruding from the center portion of one surface of the base member for securing the snap fastening member to a mounting plate, as will become abundantly clear below where the structure of the snap fastening member 12 will be described in more detail.

The fastening tape 11 is advanced along a longitudinal path in the direction of arrows 17 with the surface opposite to the surface from which the hooking elements project facing upward. For this purpose a tape feeding mechanism, indicated diagrammatically by reference numeral 18 is provided. The tape feeding mechanism grips the fastening tape member 11 and incrementally advances it underneath a hooper 19 filled with snap fasteners 12. This hopper is part of an automatic button feeding mechanism indicated diagrammatically by reference numeral 19'. The snap fastener feeding mechanism is synchronized with the tape feeding mechanism 18 and operates to dispense a single snap fasterner 12 onto the fastening tape member 11 each time it is incrementally advanced by the tape feeding mechanism. Thus, as shown, the fastening tape 11, after passing through the snap fastener feeding mechanism, carries a series of snap fasteners situated at spaced intervals along the fastening tape with the surface of base member 15 opposite to the surface thereof from which the holding means protrudes and the upwardly facing side of the fastening tape member in contacting relationship with respect to each other.

As the fastening tape continues to be advanced in the manner described, each snap fastener 12 is moved to a position where it is subjected to the action of a spin welding mechanism, indicated diagrammatically by reference numeral 20. The spin welding mechanism, which is also synchronized with the tape and snap fastener feeding mechanisms, operates to engage the snap fastener and spin it at high speed against the fastening tape member. Simultaneously, with this spinning of the snap fastener 12, the spin welding mechanism operates to press the snap fastener 12 and fastening tape member 11 together. The resulting friction between the spinning snap fastener 12 and fastening tape member creates heat sufficient to melt the plastic material of the snap fastener and fastening tape member at the places where the snap fastener and fastening tape member contact each other. After a sufficient film of molten plastic material has been formed, the spinning of the snap fastener 12 is terminated and, while the snap fastener and fastening tape member remain pressed together, the molten plastic is allowed to cool and set thus fusing the snap fastener 12 and fastening tape member 11 together as an integral welded unit.

Eventually the fastening tape member with the integrally welded snap fasteners is moved into position where a cutting mechanism, indicated generally by reference numeral 21, operates to cut away the excess fastening tape around the periphery of the base member to produce individual fastening devices, for example, as illustrated in FIG. 2. These fastening devices are then dropped into a suitable collector. It will be recognized that a useful composite fastening device comprising a length of fastening tape 11 and a series of snap fasteners 12 disposed in integral melt-bonded relationship thereto at selected intervals along the tape length can also be produced simply by cutting the fastening tape member into suitable lengths rather than into individual fastening devices as presently preferred.

The structure of a preferred embodiment for a snap fastening member is best illustrated in FIGS. 3 to 5 where it will be seen that the surface of base member 15 which is melt bonded to the fastening tape by the process described above is formed with a series of spaced concentric ridges or ribs 22a, 22b and 22c. Ridge 22a, as shown, extends along the peripheral edge of base member 15 and ridge 22c is located centrally of the base member 15 to closely encircle the circular center portion of the base member which supports the holding means to which reference, in more detail, will be made below. Ridge 22b located between ridges 22a and 22c but closer to peripheral ridge 22a than center ridge 22c.

Figure 6:
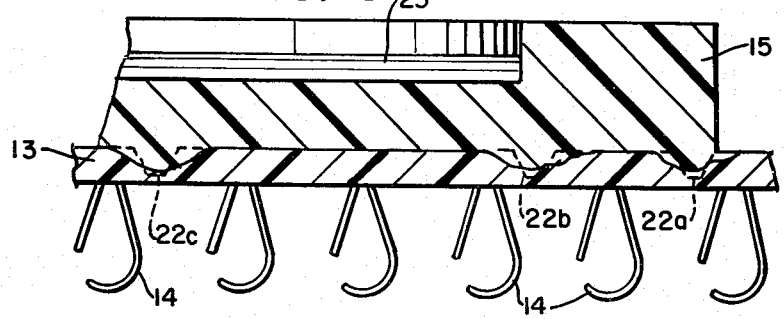
FIG. 6 is a partial cross-sectional view of a fastening device of this invention taken along the lines 6—6 of FIG. 5 showing the melt bond between the fastening member and snap fastening member.

These ridges are the areas of the snap fastening member which melt during the spin welding operation and insure that an adequate bond is obtained between the fastening member and snap fastening member without any distortion. As shwon in FIG. 6, the melt bond between the snap fastener 12 and fastening tape member 11 is, with this construction, formed along concentric bands coinciding with the position of concentric ridges 22a, 22b, 22c on base member 15. Here, it will be seen that ridges, indicated in their premelted condition by dotted lines 22a, 22b and 22c, and the portions of the fastening tape member 11 which contact these ridges have been melted and fushed together to form an integral unitary structure.

Referring again to the preferred embodiment shown in FIGS. 3 to 5, it will be seen that the surface of the base member 15, opposite to the surface which carries ridges 22a, 22b and 22c is formed with an annular ring of teeth 23 also encircling the circular center portion of the base member which supports the holding means. These teeth are adapted to be engaged by the spin welding mechanism for the purpose of centering the snap fastening member and spinning the snap fastener relative to the fastening tape in the manner described above the connection with FIG. 1. However, the use of an annular ring of teeth for centering the snap fastening member during the spin welding operation is an example of only one of the numerous methods for performing this function.

The holding means of the snap fastening member in one preferred embodiment comprises a pair of upstanding gripping members 25 which are resiliently mounted in diametrically spaced relationship on the side of the base member opposite to the side carrying the ridges 22a, 22b, 22c within the annular ring of teeth 23. For purposes of mounting each gripping member 25 in this manner, the circular center portion of base member 15 which is bordered by the annular ring of teeth 23 is provided with a generally H-shaped slot 26 which defines two resilient cantilevered mounting platforms 27 which are integrally connected to base member 15. As shown, the gripping members are mounted closely adjacent the free ends of mounting platforms 27 and a relief slot 28 is formed in the platforms to provide them with increased flexibility and facilitate the molding process.

The outer remote sides of the gripping members 25 are preferably formed with outwardly projecting retaining ears 29 and outwardly and downwardly sloping cam surfaces 30 positioned above the retaining ears. The opposed inner sides of the gripping members 25 are formed with upwardly and outwardly inclined flat surfaces 31. Thus, each gripping member has a generally tapering cross-sectional configuration which is wider at the base portion than at the terminal end to allow for easy insertion into an opening in a mounting plate.

Figure 7:
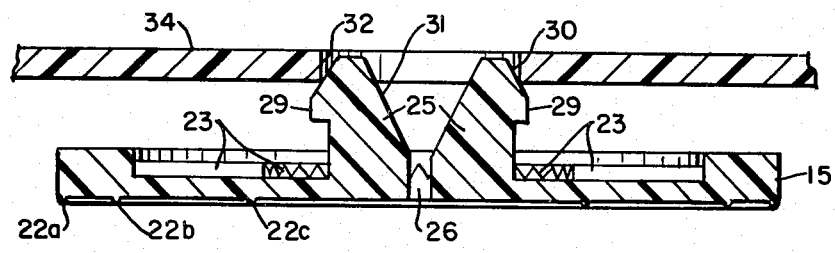
FIGS. 7 to 9 are cross-sectional views of the fastening device and mounting plate to which the fastening device is adapted to be attached showing progressive stages of the attachment procedure.
Figure 8:
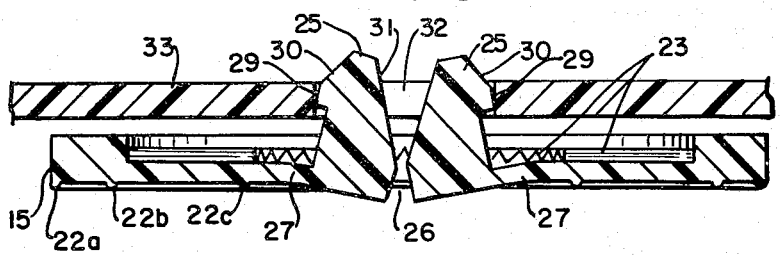
Figure 9:
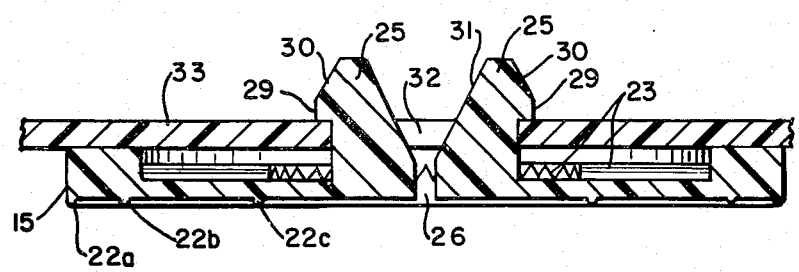

As mentioned above, the snap fastening member 12 is adapted to be snapped into locking engagement with a mounting plate. The manner in which this is accomplished will now be described in connection with FIGS. 7 to 9. The snap fastening member 12 is first placed in the position shown in FIG. 7 with the gripping members extending partly into a hole 32 drilled or punched in the mounting plate 33. From this position pressure is applied to the snap fastening member in a direction toward the mounting plate thus causing the cam surfaces 30 of the gripping members 25 to cam against the edge of the hole 32 which, in turn, causes the gripping members to move toward each other in arcuate paths from their initial position shown in FIG. 7 into the positions shown in FIG. 8. This movement of the gripping members is due entirely to flexure of spring deflection of the respective mounting platforms 27 since the gripping members are rigid and this rigidity is maintained during insertion into the hole. When the retaining ears 29 of the gripping members 25 have cleared the rear surface 34 of the mounting plate 33, the gripping members snap back to their initial position capturing the mounting plate between the ears 29 and base member 15 to thereby lock the snap fastening member in place. This final locked position of snap fastener 12 and mounting plate 33 is shown in FIG. 9.

Not only is the snap fastening member locked firmly in place, but any attempt to remove it by applying pulling or prying forces to the base member 15 will result in a tightening effect as such pulling or prying forces serve only to force the gripping members further apart thereby increasing the strength of the connection. The snap fastener 12, may of course, be easily removed from the mounting plate simply by squeezing the gripping members together from the rear and pushing the snap fastening member back through the hole in the mounting plate.

Figure 10:
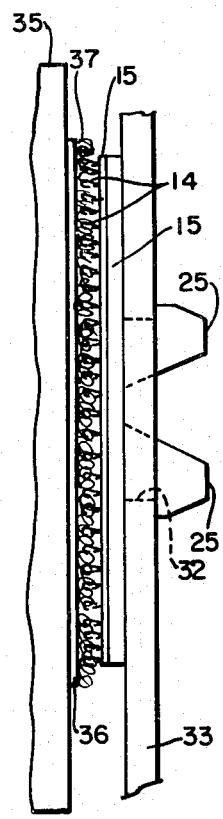
FIG. 10 is a cross-sectional view showing one manner in which the fastening device of FIG. 2 is intended to be used.

FIG. 10 illustrates one manner in which the fastening device shown in FIG. 2 can be used. As shown, the fastening device has been snapped into a hole 32 in mounting plate 33 which may form part of a larger structure. Object 35 has attached thereto a complementary fastening member 36 which has a pile surface of complementary hooking elements 37 releasably interengageable with hooking elements 14. Upon moving object 35 toward the mounting plate 33 and pressing the hooking elements and complementary hooking elements in face-to-face relationship, a large number of hooking elements will interengage with a large number of complementary hooking elements to thereby hold object 35 firmly in place on the mounting plate 33.

Figure 11:
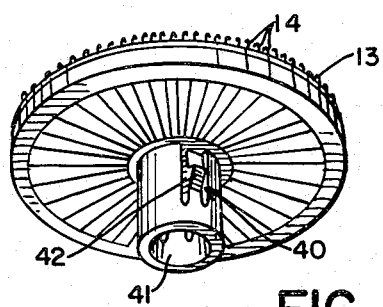
FIG. 11 is a perspective view of another fastening device which may be produced according to this invention.

The structure of a second preferred embodiment for a snap fastening member is illustrated by the fastening device in FIG. 11. In this embodiment, the holding means of the snap fastening member comprises a pair of gripping members 40 which are resiliently mounted in diametrically spaced relationship on opposite sides of tubular member 41. As shown, the gripping members 40 extend in a direction substantially parallel to the axis of the tubular member. The outer sides of the gripping members are formed of tapered surfaces 42 which allows for easy insertion into an opening in a mounting plate.

Figure 12:
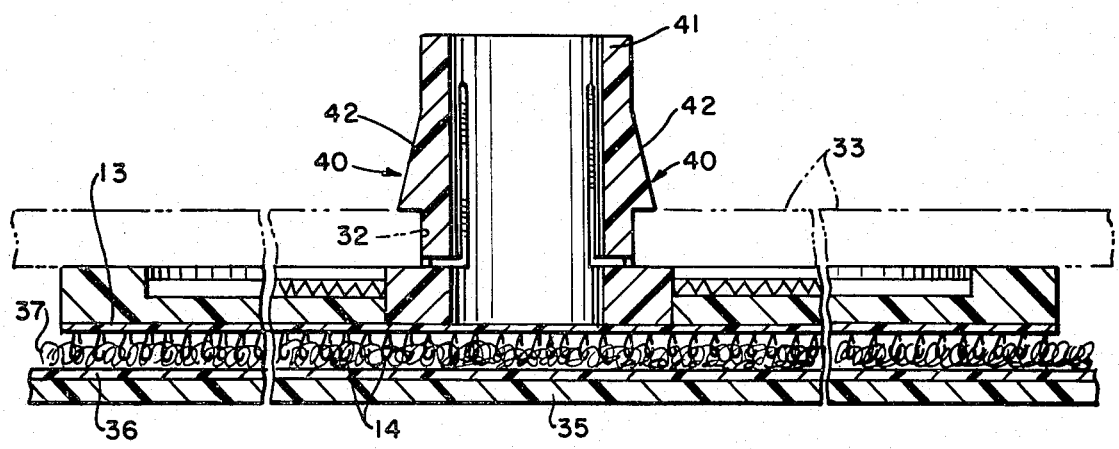
FIG. 12 is a cross-sectional view showing one manner in which the fastening device of FIG. 11 is intended to be used.

FIG. 12 illustrates one manner in which the fastening device shown in FIG. 11 can be used. As shown, the fastening device has been snapped into a hole 32 in a mounting plate 33 which may form part of a larger structure. Object 35 has attached thereto a complementary fastening member 36 which has a pile surface of complementary hooking elements 37 releasably interengageable with hooling elements 14. Upon moving object 35 toward the mounting plate 33 and pressing the hooking elements and complementary hooking elements in face-to-face relationship, a large number of hooking elements will interengage with a large number of complementary hooking elements to thereby hold object 35 firmly in place on the mounting plate 33.

In the preferred embodiments of this invention, the hook-type hooking elements 14 and base element 13 of the fastening member 11 are molded of thermoplastic material as an integral unit. A suitable molded fastening member of this type is the one described in copending commonly assigned U.S. Patent application Ser. No. 824,597, filed May 14, 1969, now abandoned in favor of continuation application Ser. No. 203,878, filed Dec. 1, 1971. A divisional application of U.S. application Ser. No. 824,597 which was filed under Ser. No. 198,002 on Nov. 11, 1971, resulted in the issuance of U.S. Pat. No. 3,752,619 dated Aug. 14, 1973. A second divisional application of U.S. application Ser. No. 824,597 was filed on Nov. 11, 1971, under Ser. No. 198,003, now U.S. Pat. No. 3,762,000, dated Oct. 2, 1973. The complementary hooking elements 37 comprise loop-type hooking elements of the type described in U.S. Pat. No. 3,009,235. Hook and loop type hooking elements of this nature are characterized in that when they are pressed into face-to-face relation a large number of the hook-type hooking elements and a large number of loop-type hooking elements become interengaged with each other. Separation of the hook and loop type hooking elements is strongly resisted when various forces are applied, for example, forces parallel to the interfacial plane of engagement but separation is quite readily effected by peeling forces applid substantially normal to the interfacial plane of engagement. For a more complete description of these hook and loop-type hooking elements, reference is made to the above-mentioned U.S. patent and patent application.

Alternatively, the fastening tape member 11 may comprise a woven or knitted thermoplastic material. Suitable woven thermoplastic materials are the ones described in U.S. Pat. No. 2,717,437 to which reference has been previously made; and a suitable knitted thermoplastic material is described in commonly assigned copending U.S. patent application Ser. No. 659,668, filed Aug. 10, 1967. Moreover, it will be understood that while the fastening tape member 11 and snap fastening member 12 of the fastening structure are preferably made of similar thermoplastic material, they can also be made of dissimilar thermoplastic materials or, if desired, one may be made of material other than plastic such as metal. For instance, the snap fastening member 12 may comprise a metallic construction or the fastening tape member may comprise metallic material, as for example, the woven metallic material described in U.S. Pat. No. 3,461,513. In the event either the fastening tape member 11 or the snap fastening 12 is made of metallic material, the molten plastic material of the other member will flow into the proclivities and declivities (surface irregularities) of the metal and upon setting will adhere to the metallic surface to produce a strong melt-bonded joint at the interface. For instance, with a woven metallic fastening tape member and thermoplastic snap fastening member, the molten plastic of the latter will flow into the interstices between the metallic warp and weft yarns of the base element to form this melt bond.

We claim:

1. A method of making a fastening device comprising the steps of:
   a. taking a tape fastening member having:
      1. a flexible base element; and
      2. a multiplicity of flexible resilient hooking elements projecting from one surface of the base element and adapted to be secured to a surface having complementary hooking elements by pressing opposed hooking elements and complementary hooking elements together in face-to-face relation;
   b. incrementally advancing said tape fastening member along a longitudinal path;
   c. taking a snap fastening member including:

1. a flexible base member of a heat meltable plastic material having at least two meltable concentric ridges extending upwardly from one surface thereof; and
2. holding means protruding from one surface of the base member for securing the snap fastening member to a mounting plate;

d. placing said snap fastening member in engaging relation with said incrementally advancing tape fastening member with the surface of the snap fastening member having said concentric meltable ridges in face-to-face relation with the surface of the base element of said tape fastening member opposite to the surface from which the multiplicity of hooking elements extend;

e. spinning the snap fastening member relative to the tape fastening member while simultaneously pressing said snap fastening member and tape fastening member together sufficient to create frictional heat sufficient to form a molten film at least along the concentric ridges of the snap fastening member and between contacting portions of the tape fastening member an the snap fastening member;

f. terminating said spinning action of said snap fastening member relative to said tape fastening member; and g. permitting said molten film created by said frictional heat to cool and solidify to thereby produce an intergral melt bond between said tape fastening member and said snap fastening member without distortion thereof.

2. The method according to claim 1 wherein the snap fastening member and fastening member are made of nylon.

3. The method of making a fastening device according to claim 2 wherein said snap fastening member includes a plurality of teeth members extending radially from the central portion of the snap fastening member on the same side as said holding means, the method further comprising gripping said holding means and said radially extending teeth members with a spinning mechanism and spinning the snap fastening member at rotational speeds sufficient to create sufficient frictional heat to form a molten film at least along the concentric ridges of the snap fastening member and between the contacting portions of the tape fastening member and the snap fastening member to thereby produce an integral melt bond between said tape fastening member and said snap fastening member without distortion of either member.

4. The method of making a fastening device according to claim 3 further comprising taking said tape fastening member having a flexible base element of a heat meltable material to thereby create a molten film between the snap fastening member and the base element of the tape fastening member along the contacting portions thereof.

* * * * *